United States Patent Office 3,713,854
Patented Jan. 30, 1973

3,713,854
REDUCED SILICA-NUCLEATED GLASS-
CERAMIC ARTICLES
George H. Beall, Big Flats, N.Y., assignor to Corning
Glass Works, Corning, N.Y.
Continuation-in-part of application Ser. No. 699,048,
Jan. 19, 1968. This application Sept. 8, 1971, Ser.
No. 178,719
Int. Cl. C04b 33/00
U.S. Cl. 106—39 DV                                    8 Claims

ABSTRACT OF THE DISCLOSURE

This invention relates to the manufacture of glass-ceramic articles from essentially any thermally crystallizable silicate base glass composition utilizing reduced silica as a nucleating agent. Silicon metal may be incorporated into the batch, or other strongly reducing constituents may be added so that a part of the silica in the melt will be reduced to either silicon monoxide or elemental silicon.

---

Figure 1:
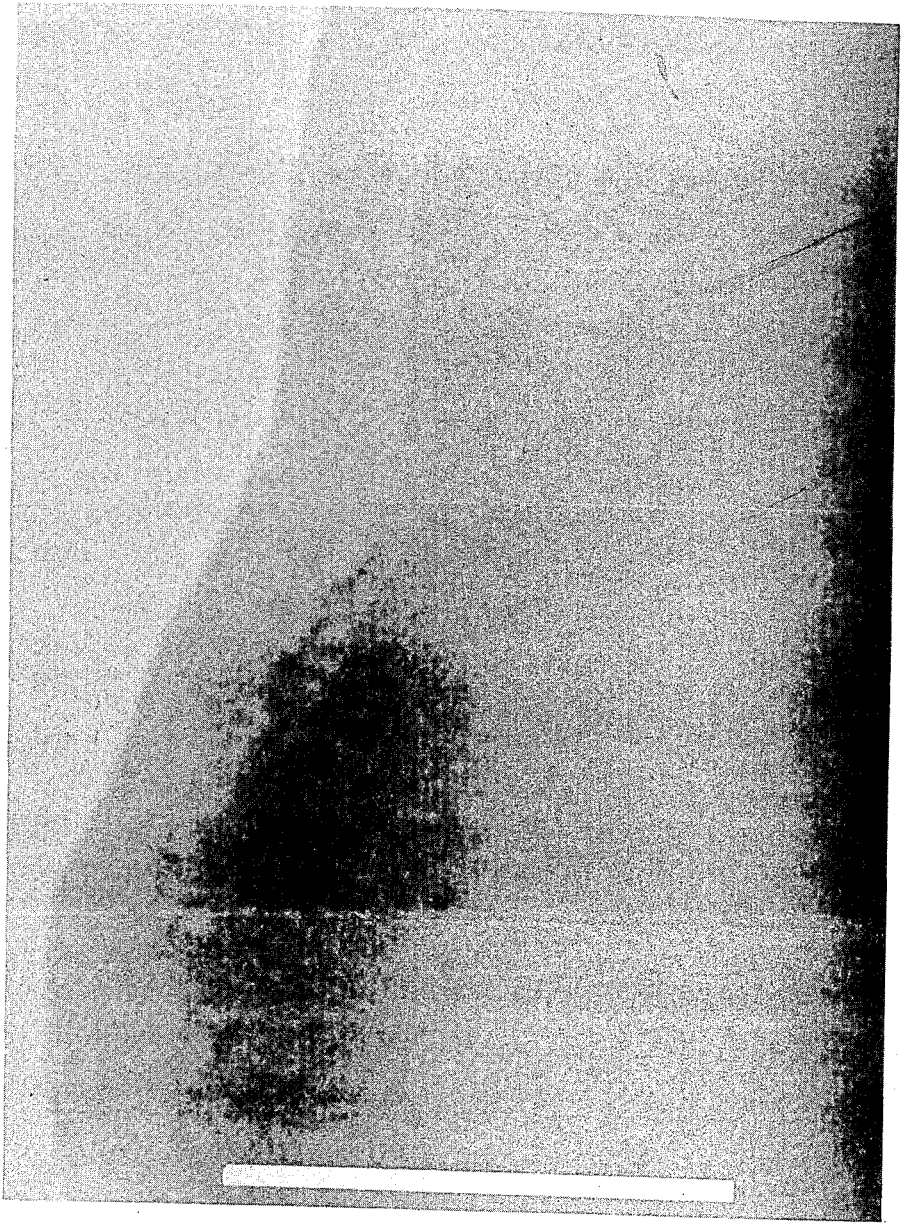

This application is a continuation-in-part of my co-pending application, Ser. No. 699,048 filed Jan. 19, 1968, and now abandoned.

A glass-ceramic article is produced through the controlled crystallization in situ of a glass article. In general, the manufacture of glass-ceramic articles comprises three broad steps: first, a glass-forming batch to which a nucleating agent is commonly added is compounded; second, this batch is melted and the melt cooled and shaped to a glass article of a desired configuration; and third, the glass article is heat treated according to a particular time-temperature schedule such that nuclei are first formed in the glass which provide sites for the growth of crystals thereon as the heat treatment is continued.

In structure, a glass-ceramic article is composed of relatively uniformly-sized, fine-grained crystals dispersed in a glassy matrix, the crystal phase comprising the predominant portion of the body. Glass-ceramic articles are commonly defined as being at least 50% crystalline and, in many instances, are over 90% crystalline. Inasmuch as the articles are highly crystalline, the physical properties thereof are usually materially different from those of the original glass and are closely akin to those exhibited by the crystals. Furthermore, the residual glassy matrix will have a composition considerably different from that of the parent glass since the crystal components will have been precipitated therefrom.

U.S. Pat. No. 2,920,971, the basic patent in the field of glass-ceramics, provides an extensive study of the practical and theoretical considerations involved in the manufacture and properties of these articles and reference is made thereto for further discussion of these factors. That patent specifically illustrates the unique faculty of titania in nucleating essentially any glass composition to a fine-grained glass-ceramic article. Although this substantial universality of $TiO_2$ as a nucleating agent is extremely important from a practical or commercial point of view, the resulting products therefrom have certain drawbacks. In the main, these shortcomings are two: (1) the reduction of $TiO_2$ at moderately elevated temperatures under even very mild reducing conditions; and (2) the lack of thermal stability of the crystal phases at higher temperatures, e.g., over 1200 C. Research has, therefore, been continuous to discover other nucleating agents or means for improving $TiO_2$-nucleated glass-ceramic articles to produce articles having desirable properties for particular uses.

I have found that numerous silicate and aluminosilicate glasses can be crystallized through heat treatment to extremely fine-grained glass-ceramics using reduced silica as a nucleating agent. This reduced silica is produced in a uniform dispersion throughout the volume of the glass during the melting process through the addition to the batch of such highly reducing materials as silicon metal powder, sugar, graphite, or other reducing agent. The use of reducing atmospheres or other superficial reducing conditions is not normally sufficient to provide a uniform dispersion of reduced silica throughout the volume of the glass, which is necessary to provide effective nucleation and thus a fine-grained glass-ceramic material. Glass articles produced from such a batch are normally gray in color but are amorphous when examined by X-ray diffraction analysis. Heat treatment of these glasses produces fine-grained glass-ceramic articles which are believed to be nucleated by a reduced form of silica, either elemental silicon or some kind of a silicon monoxide complex.

Figure 2:
Figure 3:
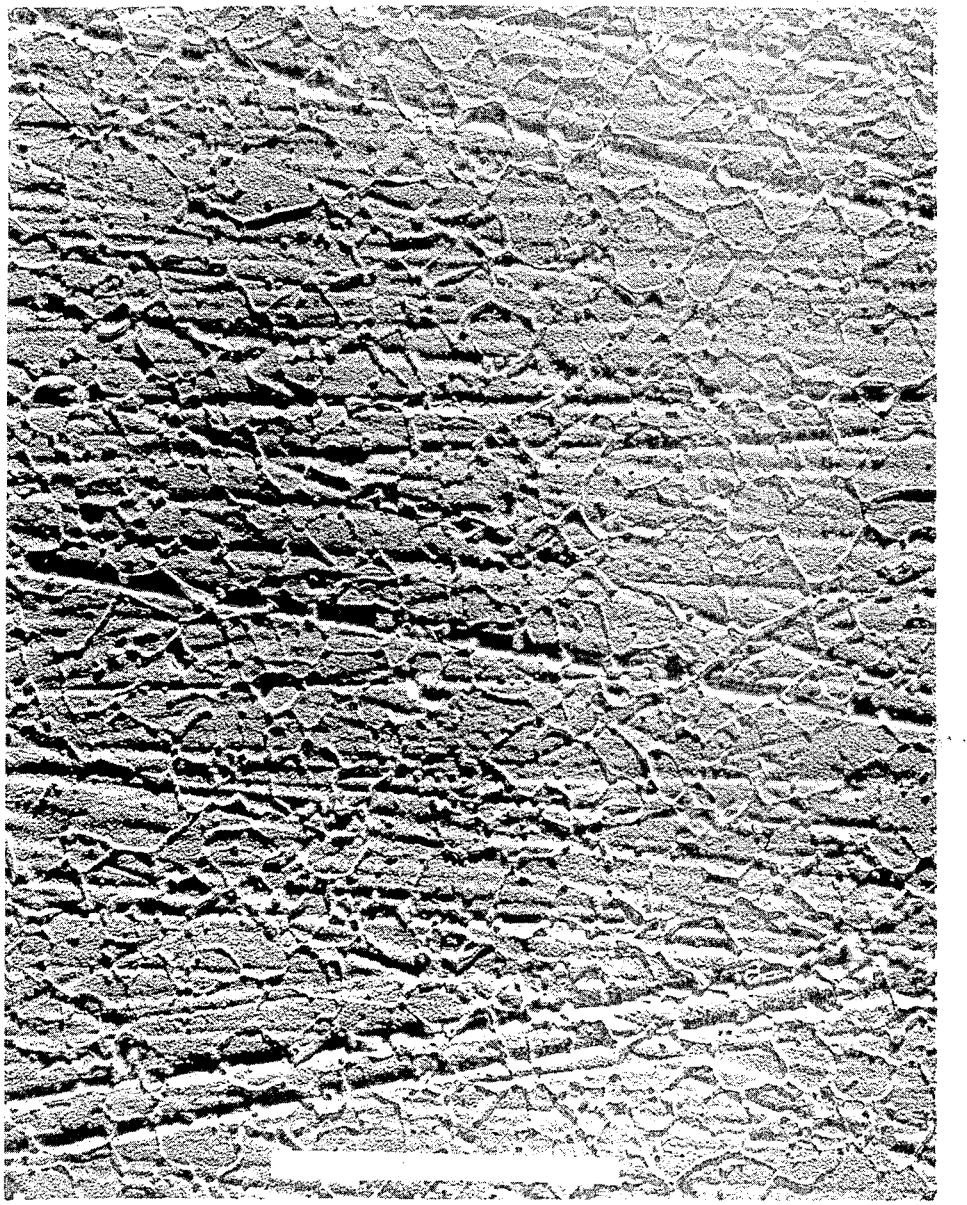

The fact that glass-ceramics of the invention are indeed internally nucleated by a form of reduced silica, rather than surface crystallized or self-nucleated, has been confirmed by electron photomicrographs taken at very high magnification. Representative photomicrographs are set forth in the drawing wherein:

FIG. 1 is an electron photomicrograph wherein the white bar represents 0.1 micron, showing a magnesia aluminosilicate glass into which has been incorporated 0.5% by weight of silicon metal;

FIG. 2 is an electron photomicrograph of the glass of FIG. 1, wherein the white bar again represents 0.1 micron, which was taken after the glass had been subjected to a nucleating heat treatment at 800° C. for 4 hours; and FIG. 3 is an electron photomicrograph wherein the white bar represents one micron, showing the fully crystallized material obtained upon further heat treatment of the nucleated glass of FIG. 2 for 2 hours at 1400° C.

This form of nucleation has three significant advantages over the use of $TiO_2$. First, this nucleation is apparently universal through all binary and more complex silicate and aluminosilicate glasses not containing a metal oxide more easily reduced than silica. Second, only very minor amounts of reduced silica are required to achieve nucleation. Hence, 2% by weight has been determined to be adequate in all instances and, usually, only about 0.15–1% by weight is sufficient. The employment of only extremely small amounts of nucleating agent is very advantageous since it permits the production of highly refractory articles composed essentially solely of stoichiometric oxide compositions. Thus, advantage can be taken of the high melting points of such stoichiometric compounds as beta-spodumene, cordierite, nepheline, celsian, etc. where the amount of nucleating agent or other additives which can act as fluxes are essentially totally absent. Third, the highly efficient technique of nucleation exhibited by reduced silica is useful in controlling grain growth in sintering processes involving the use of a vitreous frit. Such a frit, when ground or milled to a sufficiently small particle size, will sinter to an extremely fine-grained body with very little tendency toward subsequent grain growth.

In its broadest terms, my invention comprises melting a batch for a silicate glass which contains essentially no metal oxide more readily reducible than silica, to which about 0.15–2% by weight elemental silicon, or an amount of a reducing agent such that the melt will contain reduced silica in a quantity equivalent to about 0.15–2% by weight of elemental silicon, is added. This melt is simultaneously cooled at least below the transformation range of the melt and a glass body shaped therefrom. The transformation range is that temperature at which a liquid melt is deemed to have been transformed into an amorphous solid, this temperature generally being considered as lying between the strain point and the annealing point of the glass. The glass shape is then heated to a temperature between about 750°–1400° C. for a period of time sufficient to achieve the crystallization in situ desired. Since the rate of crystallization is dependent upon the temperature employed, it can be appreciated that at temperatures near the upper end of the crystallization range very short dwell periods will be required, e.g., only about ¼ hour or less; whereas at the cooler end of the crystallization range extended times of 24–48 hours may be required to complete crystallization.

My preferred heat treatment schedule comprises a two-step procedure wherein the glass article is first heated to a temperature somewhat above the transformation range (750°–900° C.) and held thereat for a period of time to assure good nucleation and to initiate crystal growth. The temperature of the article is thereafter raised to about 1000°–1300° C. and maintained thereat for a period of time to complete crystal growth. In my preferred two-step heat treating procedure, a nucleation period of about 2–8 hours followed by a crystallization growth period of about 2–12 hours are generally employed.

It will be understood that various modifications in procedure are possible. Thus, when the melt is quenched and shaped into a glass article, the article may be cooled to room temperature for visual inspection as to glass quality before entering into the heat treating cycle. However, where fuel economies are sought, the melt may be quenched to a glass shape at just below the transformation range only and then the heat treatment begun immediately. Further, although a two-step heating schedule is preferred, a very satisfactory product can be produced when the glass article is merely heated from room temperature or the transformation range to temperatures within the 750°–1400° C. range and held thereat for a sufficient length of time to develop the desired crystallization. Also, if the rate of heating is relatively slow and the final temperature near the upper limit of the heat treating range, no hold period at any one temperature may be required. Nevertheless, since the growth of crystals is dependent upon time and temperature, the rate of heating the glass article above the transformation range ought not to be so rapid that the formation of sufficient crystals to support the article cannot occur and consequent deformation and slumping of the article will result. Therefore, although heating rates of 10° C./minute and higher have been utilized successfully, particularly where physical supports were provided for the glass articles, I prefer a rate of about 3°–5° C./minute. These heating rates have produced articles exhibiting very little, if any, deformation throughout the wide field of compositions contemplated by this invention.

As indicated above, my invention is operable with any silicate glass wherein an amount of reduced silica equivalent to about 0.15–2% by weight elemental silicon is attained and wherein metal oxides more readily reducible than silica are essentially absent. The presence of oxides more readily reducible than silica, however, will prevent the formation of the required reduced silica, since the reducing agents added to the batch will be expended in the reduction of these oxides. Thus, the batch should be essentially free of $PbO$, $SnO_2$, $Sb_2O_3$, $Bi_2O_3$, $Fe_2O_3$, $ZnO$, and $TiO_2$. The reducibility of these oxides may readily be determined from basic thermodynamic considerations, as explained, for example, in "Thermodynamic Properties of 65 Elements—Their Oxides, Halides, Carbides, and Nitrides"; Bulletin 605, U.S. Bureau of Mines.

Table I records batch compositions, expressed in weight percent on the oxide basis, of thermally crystallizable glasses which were heat treated to yield fine-grained glass-ceramic articles. The batch ingredients may comprise any materials, either oxides or other compounds which, on being fused together, are converted to the desired oxide composition in the proper proportions. The batches were compounded, ball-milled to aid in obtaining a homogeneous melt, and then melted in silica or alumina crucibles at temperatures of about 1600°–1650° C. for 16 hours. The silicon metal and the reducing agents dextrose and silicon carbide were added as powders finer than 100 Tyler mesh. Glass cane of about ¼ inch diameter was drawn from each melt and the remainder of each melt poured into a circular patty of about ½" thickness into steel plates. The glasses were immediately transferred to an annealer operating at 650° C. Following the annealing, the glass articles were placed in an electrically-fired furnace and subjected to the heat treatments recited in Table II. At the conclusion of the heat treatment schedule, the current to the furnace was cut off and the crystallized articles were either removed directly into the ambient atmosphere or merely left in the furnace and allowed to cool within the furnace. The furnace rate of cooling averaged about 2°–3° C. per minute.

TABLE I

| Percent | 1 | 2 | 3 | 4 | 5 | 6 |
|---|---|---|---|---|---|---|
| $SiO_2$ | 67.0 | 67.0 | 62.25 | 63.5 | 48.75 | 49.5 |
| $Al_2O_3$ | 24.5 | 24.5 | 22.5 | 28.0 | 21.0 | 33.0 |
| $Li_2O$ | 4.0 | 4.0 | 4.0 | 8.0 | | |
| $MgO$ | 3.5 | 3.5 | 3.5 | | | |
| $Si$ | 1.0 | | | | 0.5 | 0.25 | 0.5 |
| $SiC$ | | 1.0 | | | | |
| Dextrose | | | 7.75 | | | |
| $BaO$ | | | | | 30.0 | |
| $CaO$ | | | | | | 17.0 |

| | 7 | 8 | 9 | 10 | 11 | 12 |
|---|---|---|---|---|---|---|
| $SiO_2$ | 51.5 | 53.25 | 59.4 | 73.5 | 71.5 | 54.0 |
| $Al_2O_3$ | 30.0 | 33.0 | | 20.0 | 23.0 | 12.0 |
| $Li_2O$ | | | 6.0 | 6.0 | | |
| $MgO$ | | | 13.0 | 15.0 | | |
| $Na_2O$ | 18.0 | | | | | |
| $CaO$ | | | | 25.0 | | 17.0 |
| $Si$ | 0.5 | 0.15 | 0.6 | 0.5 | 0.5 | 17.0 |

| | 13 | 14 | 15 | 16 |
|---|---|---|---|---|
| $SiL_2$ | 70.6 | 70.6 | 70.6 | 70.6 |
| $Al_2O_3$ | 19.8 | 19.8 | 19.8 | 19.8 |
| $Li_2O$ | 5.0 | 5.0 | 5.0 | 5.0 |
| $MgO$ | 1.0 | 1.0 | 1.0 | 1.0 |
| $Si$ | 0.6 | 0.6 | 0.6 | 0.6 |
| $PbO$ | 3.0 | | | |
| $SnO_2$ | | 3.0 | | |
| $Sb_2O_3$ | | | 3.0 | |
| $ZnO$ | | | | 3.0 |

Table II records the heat treatment schedule to which each example was subjected along with a visual description of each crystallized article, a measurement of the coefficient of thermal expansion (25°–300° C.) where made, and the crystal phases present as determined by X-ray diffraction analysis. In each treatment, the temperature was raised at a rate of about 5° C./minute to the hold temperature.

TABLE II

| Ex. No. | Heat treatment °C. | hours | Visual description | Crystal phases | Expansion coefficient ($\times 10^{-7}$/°C.) |
|---|---|---|---|---|---|
| 1 | 800 / 1,100 | 4 / 4 | Gray, cherty | Beta-spodumene s.s. | |
| 2 | 800 / 1,100 | 4 / 4 | ----do---- | ----do---- | |
| 3 | 800 / 1,100 | 4 / 4 | ----do---- | ----do---- | |
| 4 | 800 / 1,060 | 4 / 4 | Gray-brown, cherty | ----do---- | |
| 5 | 800 / 1,060 | 4 / 4 | Gray, waxy-cherty | Hexacelsian | |
| 6 | 800 / 1,060 | 4 / 4 | Gray-green, cherty | Anorthite | |
| 7 | 800 / 1,060 | 4 / 4 | Gray, waxy-cherty | Nepheline | |
| 8 | 800 / 1,200 | 4 / 4 | Gray, glassy | Cordierite | 5.8 |
| 8 | 800 / 1,300 / 1,400 | 4 / 4 / 20 | Gray interior, white, translucent exterior. | ----do---- | 7.9 |
| 9 | 800 / 1,100 | 4 / 4 | Gray, cherty | Diopside | |
| 10 | 800 / 1,100 | 4 / 4 | ----do---- | Beta-spodumene s.s. | −2.0 |
| 11 | 800 / 1,200 | 4 / 4 | ----do---- | ----do---- | −0.3 |
| 12 | 800 / 1,000 | 4 / 4 | ----do---- | Beta-cristobalite, silicon | |
| 13 | 800 / 1,000 | 4 / 4 | White, coarse-grained, badly deformed. | Beta-spodumene s.s. | |
| 14 | 800 / 1,000 | 4 / 4 | ----do---- | ----do---- | |
| 15 | 800 / 1,000 | 4 / 4 | ----do---- | ----do---- | |
| 16 | 800 / 1,000 | 4 / 4 | ----do---- | Beta-spodumene s.s., gahnite | |

Tables I and II amply illustrate the effectiveness of reduced silica as a nucleating agent or crystallization promoter for various silicate glass composition fields. That metal oxides more easily reducible than silica ought to be essentially absent from the glass composition is clearly demonstrated in Example 13 containing PbO, Example 14 containing $SnO_2$, Example 15 containing $Sb_2O_3$, and Example 16 containing ZnO wherein the glasses were colorless and not gray, and the crystallized articles were not uniformly fine-grained; in fact, they were surface-crystallized and coarse-grained. The glass-ceramic articles produced by this invention are highly crystalline, frequently containing more than 75% by weight crystals, with substantially all the crystals being finer than 10 microns in diameter and most being less than 1 micron in diameter.

Further examples of glass-ceramics having various desirable crystal phases which may be prepared using reduced silica as a nucleating agent according to the procedures hereinbefore described are shown in Table III below:

TABLE III

| | Hexacelsian | | Anorthite | |
|---|---|---|---|---|
| | 17 | 18 | 19 | 20 |
| $SiO_2$ | 45.75 | 46.75 | 57.5 | 36.5 |
| $Al_2O_3$ | 14.0 | 26.0 | 26.0 | 43.0 |
| MgO | | | | |
| Si | 0.25 | 0.25 | 0.5 | 0.5 |
| BaO | 40.0 | 27.0 | | |
| CaO | | | 16.0 | 20.0 |

| | Nepheline | | Cordierite | | Diopside | |
|---|---|---|---|---|---|---|
| | 21 | 22 | 23 | 24 | 25 | 26 |
| $SiO_2$ | 54.5 | 47.5 | 55.85 | 51.85 | 59.4 | 59.4 |
| $Al_2O_3$ | 25.0 | 35.0 | 29.0 | 37.0 | | |
| MgO | | | 15.0 | 11.0 | 10.0 | 20.0 |
| $Na_2O$ | 20.0 | 17.0 | | | | |
| CaO | | | | | 30.0 | 20.0 |
| Si | 0.5 | 0.5 | 0.15 | 0.15 | 0.6 | 0.6 |

The amounts of reduced silica required for adequate nucleation vary from one composition system to another. In general, the equivalent of about 0.5–1% silicon metal is sufficient. As illustrated in the tables, a carbonaceous reducing agents may be substituted for elemental silicon in the batch but seeds are produced in the glass due to the oxidation of the carbon at the expense of silica. The solubility of powdered silicon metal is not large in most composition systems with amounts in excess of about 2% by weight producing stones in the glass. However, as Example 12 demonstrates, much larger amounts can be included in glasses of the calcium aluminosilicate system without resulting in excessive stones. Such greater amounts of metallic silicon are not needed for nucleation, cause silicon to be crystallized as a significant crystal phase upon heat treatment, and greatly add to the cost of the article.

It is known from phase equilibria determinations that there is a large field of beta-spodumene solid solutions (s.s.) existing at temperatures in excess of 1300° C. in the ternary system $SiO_2$-$LiAlO_2$-$MgAl_2O_4$ and glass-ceramics containing this solid solution as the principal crystal phase are well-known. In the past, however, these articles have been nucleated with $TiO_2$ and/or $ZrO_2$ and the effect of these oxides has been to reduce the normal thermal stability of the crystalline assemblage in the final glass-ceramic products. This is the result of a lowering of the solidus temperature which is especially noticeable in the case of $TiO_2$ additions.

The dimensional stability at high temperatures of such two-phase assemblages is also affected since beta-spodumene solid solutions will accept a variable amount of $TiO_2$ depending upon the temperature. Hence, if a glass-ceramic article containing beta-spodumene solid solution is crystallized at a high temperature, a significant amount of $TiO_2$ may be expected to enter therein. If this same article is later cooled and held at some elevated temperature below the crystallization temperature, a certain amount of $TiO_2$ may exsolve as a phase such as rutile. Therefore, for material applications where high thermal stability, including stringent dimensional tolerances, is required, an essentially one-phase glass-ceramic article would be most desirable, this article being nucleated by very small quantities of a foreign phase. With quantities of silicon metal in the range of ½–1% by weight, glass-ceramic articles containing essentially only beta-spodumene solid solution have been produced which are capable of being heated at 1350° C. with no apparent distortion.

One of the most refractory of the very low expansion aluminosilicates is the mineral cordierite. Some cordierite solid solutions have melting points around 1450° C. Example 8 yields a glass-ceramic article which is stable at 1400° C. The cordierite crystals are extremely small (about 0.1–0.5 microns in diameter) when the glass is crystallized at 1300° C. and, while there is some grain growth at 1400° C., the crystal size still does not exceed about 1 micron. In addition, oxidation of the silicon nuclei occurs at 1400° C., at least for a small distance from the area of the glass-ceramic interface. This can be observed by the color change in Example 8 from the normal gray color of a silicon-nucleated glass-ceramic to a white, translucent material. Thus, a thin piece of silicon-nucleated glass-ceramic can be completely oxidized in air by heat treating at 1400° C. to produce a translucent, alkali-free glass-ceramic which is useful in high temperature lamp applications. Example 8 is the preferred embodiment of my invention.

The mechanism leading to the nucleation of glass-ceramic articles through the addition of metallic silicon to the glass batch or the addition of reducing agents to reduce the silica in the glass melt is not completey understood. The thermally crystallizable glass produced is normally gray or brown. The nature of the dark color is not comprehended but apparently color centers developed through oxygen deficiencies are strongly absorbing. It is believed likely that the addition of silicon metal to a molten glass or the reduction of a glass by the carbon compounds added causes a phase separation on a very small scale. This phase separation has been observed in electron photomicrographs of silicon-containing glasses taken at very high magnification. Thus FIG. 1 of the drawing is a transmission electron photomicrograph of an interior portion of a magnesia aluminosilicate glass body containing silicon metal, as it appears immediately after cooling the melt to a glass and prior to any heat treatment. The glass consists essentially, in weight percent as calculated from the batch, of about 54% $SiO_2$, 33% $Al_2O_3$, and 13% MgO, and contains about 0.5% of silicon metal in excess of the weight of the other glass constituents. The white bar in the photomicrograph represents a length of 0.1 micron. The glass appears to be completely amorphous even on a highly magnified scale, with no obvious phase separation, notwithstanding the presence of the silicon nucleating agent therein.

FIG. 2 of the drawing is a transmission electron photomicrograph of an interior portion of the glass body of FIG. 1, following the heat treatment of that body at 800° C. for four hours. This heat treatment is typical of nucleating treatments found suitable for silicon-nucleated glass-ceramics of this composition. The white bar in the photomicrograph again represents a dimension of 0.1 micron. The phase separation responsible for the nucleation of the crystalline phase in this material may be observed as dark blebs in the residual glassy material, most readily observed near the lighter edge portion of the sample.

Further heat treatment of the nucleated glass of FIG. 2 at 1400° C. for about 2 hours yields the very highly crystalline glass-ceramic material shown in FIG. 3, which is a scanning electron photomicrograph of the material wherein the white bar represents one micron. The crystals are of cordierite composition, and have been partly etched away to demonstrate that only very minor glassy phases, visible as lighter elevated boundary regions in the photomicrograph, remain in the glass-ceramic material. The crystals are very small, the largest approximating only about 0.4 micron in diameter. The small size and uniformity of the crystals attests to the efficiency and uniformity of the reduced silica nucleating phase.

This series of photomicrographs is illustrative of the utility of reduced silica nucleation in producing a glass-ceramic of essentially stoichiometric oxide composition. Thus, the glass employed was stoichiometric of cordierite and has been completely crystallized using only a very minor amount of nucleating agent to produce a glass-ceramic material which is essentially 100% cordierite.

Why silicon, or possibly silicon monoxide in part, behaves as such an effective nucleating agent for silicate glasses of widely-varying compositions is not understood, since other elemental substances such as the noble metals copper, silver, gold, etc. are operable only in very limited composition areas. It is believed unlikely that epitaxy is the major factor governing this nucleation, simply because of the wide variety of crystalline species and geometries which are all susceptible to heterogeneous nucleation by the silicon or silicon monoxide particles. The covalent nature of silicon with its hexagonal structure similar to diamond may be of major significance for reasons that are not appreciated at this time.

I claim:

1. A thermally crystallizable silicate glass containing an amount of reduced silica equivalent to about 0.15–2% by weight elemental silicon and being essentially free from PbO, $SnO_2$, $Sb_2O_3$, $BiO_3$, $Fe_2O_3$, ZnO, $TiO_2$, and other metal oxides more readily reducible than silica.

2. A glass-ceramic article consisting essentially of fine-grained inorganic crystals substantially uniformly dispersed in a glassy matrix and comprising the major proportion of the article, said crystals being formed by crystallization in situ from a silicate glass body containing an amount of reduced silica equivalent to about 0.15–2% by weight elemental silicon and being essentially free from PbO, $SnO_2$, $Sb_2O_3$, $Bi_2O_3$, $Fe_2O_3$, ZnO, $TiO_2$, and other metal oxides more readily reducible than silica.

3. A glass-ceramic article in accordance with claim 2 wherein said silicate glass body consists essentially of $Li_2O$, $Al_2O_3$, MgO, $SiO_2$, and about 0.15–2% by weight elemental silicon.

4. A glass-ceramic article in accordance with claim 2 wherein said silicate glass body consists essentially of MgO, $Al_2O_3$, $SiO_2$, and about 0.15–2% by weight elemental silicon.

5. A method for making a glass-ceramic article comprising the steps of melting a batch for a silicate glass containing an amount of reduced silica equivalent to about 0.15–2% by weight elemental silicon and being essentially free from PbO, $SnO_2$, $Sb_2O_3$, $Bi_2O_3$, $Fe_2O_3$, ZnO, $TiO_2$ and other metal oxides more readily reducible than silica, simultaneously cooling the melt at least below the transformation range thereof and shaping a glass body therefrom, thereafter heating said glass body to a temperature between about 750°–1400° C. for a time sufficient to develop the desired crystallization in situ of about ¼ to 48 hours, and then cooling the crystallized body to room temperature.

6. A method for making a glass-ceramic article according to claim 5 wherein said glass body is heated to about 750°–900° C. for about 2–8 hours and thereafter the body is heated to about 1000°–1300° C. for about 2–12 hours.

7. A method for making a glass-ceramic article according to claim 5 wherein said silicate glass consists essentially of $Li_2O$, MgO, $Al_2O_3$, $SiO_2$, and about 0.15–2% by weight of elemental silicon.

8. A method for making a glass-ceramic article according to claim 5 wherein said silicate glass consists essentially of MgO, $Al_2O_3$, $SiO_2$, and about 0.15–2% by weight of elemental silicon.

References Cited

UNITED STATES PATENTS

| | | | |
|---|---|---|---|
| 1,893,382 | 1/1933 | Watson | 65—32 |
| 3,006,775 | 10/1961 | Chen | 106—39 DV |
| 3,013,362 | 12/1961 | Calkins et al. | 106—39 DV |
| 3,253,975 | 5/1966 | Olcott et al. | 106—39 DV |
| 3,348,917 | 10/1967 | Nestor | 106—39 DV |
| 3,370,921 | 2/1968 | Wagstaff | 106—69 |
| 3,378,431 | 4/1968 | Smith | 65—32 |

FOREIGN PATENTS

| | | | |
|---|---|---|---|
| 455,460 | 1936 | Great Britain | 65—33 |
| 1,268,125 | 1961 | France | 106—39 DV |

JAMES E. POER, Primary Examiner

W. R. SATTERFIELD, Assistant Examiner

U.S. Cl. X.R.

65—33; 106—52